United States Patent
Kim et al.

(10) Patent No.: US 8,620,165 B2
(45) Date of Patent: *Dec. 31, 2013

(54) TRANSMITTER, RECEIVER FOR VISIBLE LIGHT COMMUNICATION AND METHOD USING THE SAME

(71) Applicant: Electronics and Telecommunications Research Institute, Daejeon (KR)

(72) Inventors: Dae-Ho Kim, Daejeon (KR); Sang-Kyu Lim, Daejeon (KR); Il-Soon Jang, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/828,523

(22) Filed: Mar. 14, 2013

(65) Prior Publication Data

US 2013/0195468 A1    Aug. 1, 2013

Related U.S. Application Data

(63) Continuation of application No. 12/883,574, filed on Sep. 16, 2010, now Pat. No. 8,447,189.

(30) Foreign Application Priority Data

Sep. 21, 2009  (KR) .................. 10-2009-0089108
Apr. 29, 2010  (KR) .................. 10-2010-0040051

(51) Int. Cl.
*H04B 10/00*   (2013.01)
*H04B 10/116*  (2013.01)

(52) U.S. Cl.
CPC .................. *H04B 10/116* (2013.01)
USPC ........................................... 398/172

(58) Field of Classification Search
USPC ............... 398/172, 154, 135, 136, 128
See application file for complete search history.

(56) References Cited

U.S. PATENT DOCUMENTS 7,570,246 B2    8/2009   Maniam et al.
(Continued)

FOREIGN PATENT DOCUMENTS

| JP | 2007-067531 | 3/2007 |
| KR | 10-2009-0092038 | 8/2009 |
| WO | 2007/004530 | 1/2007 |

OTHER PUBLICATIONS

Jin Young Kim et al., "New Line Coding of Visible Light Communication System for WPAN," General paper, 09-14-1-07, Korea.

(Continued)

*Primary Examiner* — Dalzid Singh
(74) *Attorney, Agent, or Firm* — Staas & Halsey LLP

(57) ABSTRACT

A visible light wireless communication receiver includes: a source code recognizing unit that receives a source bit stream and recognizes the source bit stream as source codes of a unit of a first number of bits; and a line coding unit that encodes each of the source codes into an encoding code of a unit of a second number of bits, the second number being larger than the first number. In particular, in the encoding code, the number of bits corresponding to 1 is the same as the number of bits corresponding to 0. Therefore, the change in brightness of lighting may be minimized in the visible light wireless communication.

3 Claims, 8 Drawing Sheets

(56) References Cited

U.S. PATENT DOCUMENTS

| | | |
|---|---|---|
| 7,949,259 B2 | 5/2011 | Suzuki |
| 2007/0046620 A1 | 3/2007 | Ugajin |
| 2009/0022112 A1* | 1/2009 | Shin et al. .................. 370/336 |
| 2011/0064420 A1 | 3/2011 | Rajagopal et al. |
| 2012/0001567 A1* | 1/2012 | Knapp et al. ................ 315/291 |

OTHER PUBLICATIONS

Notice of Allowance dated Jan. 24, 2013 issued in corresponding U.S. Appl. No. 12/883,574.

Office Action dated Sep. 28, 2012 issued in corresponding U.S. Appl. No. 12/883,574.

* cited by examiner

FIG.2

| | 6-BIT PATTERN HAVING THE SAME NUMBER OF 1 AND 0 |
|---|---|
| 1 | 001110 |
| 2 | 001101 |
| 3 | 010011 |
| 4 | 010110 |
| 5 | 010101 |
| 6 | 100011 |
| 7 | 100110 |
| 8 | 100101 |
| 9 | 011001 |
| 10 | 011010 |
| 11 | 011100 |
| 12 | 110001 |
| 13 | 110010 |
| 14 | 101001 |
| 15 | 101010 |
| 16 | 101100 |
| 17 | 110100 |
| 18 | 001011 |
| 19 | 111000 |
| 20 | 000111 |

FIG.3

|   |      | EXISTING 4B5B | PROPOSED 4B6B |
|---|------|---------------|---------------|
| 0 | 0000 | 11110 | 001110 |
| 1 | 0001 | 01001 | 001101 |
| 2 | 0010 | 10100 | 010011 |
| 3 | 0011 | 10101 | 010110 |
| 4 | 0100 | 01010 | 010101 |
| 5 | 0101 | 01011 | 100011 |
| 6 | 0110 | 01110 | 100110 |
| 7 | 0111 | 01111 | 100101 |
| 8 | 1000 | 10010 | 011001 |
| 9 | 1001 | 10011 | 011010 |
| A | 1010 | 10110 | 011100 |
| B | 1011 | 10111 | 110001 |
| C | 1100 | 11010 | 110010 |
| D | 1101 | 11011 | 101001 |
| E | 1110 | 11100 | 101010 |
| F | 1111 | 11101 | 101100 |
| Preamble pattern | | | 110100, 001011 |
| Idle pattern | | | 111000, 000111 |

TRANSMITTER, RECEIVER FOR VISIBLE LIGHT COMMUNICATION AND METHOD USING THE SAME

CROSS-REFERENCE TO RELATED APPLICATIONS

This application is a U.S. continuation application filed under 37 CFR 1.53(b) claiming priority benefit of U.S. Ser. No. 12/883,574 filed in the United States on Sep. 16, 2010, which claims earlier priority benefit to Korean Patent Application No. 10-2009-0089108 filed with the Korean Intellectual Property Office on Sep. 21, 2009 and Korean Patent Application No. 10-2010-0040051 filed with the Korean Intellectual Property Office on Apr. 29, 2010, the disclosures of which are incorporated herein by reference.

BACKGROUND

1. Field

The present invention relates to a visible light wireless communication apparatus and a line coding technology for removing flickering thereof, and more particularly, to a visible light wireless communication apparatus capable of reducing flickering in a visible light wireless communication system and a line coding method for removing flickering.

2. Description of the Related Art

Visible rays are rays having a wavelength in the range visible to a human eye among electromagnetic waves. The wavelength of the visible rays corresponds to 380 nm to 780 nm.

The change in nature according to the wavelength is represented by each color within the visible rays. The wavelength is short going from red to violet. Light having a wavelength longer than red is referred to as an infrared ray and light having a wavelength shorter than violet is referred to as an ultraviolet ray. In monochromatic light, red is shown at a wavelength of 700 to 610 nm, orange is shown at a wavelength of 610 to 590 nm, yellow is shown at a wavelength of 590 to 570 nm, green is shown at a wavelength of 570 to 500 nm, and blue is shown at a wavelength of 500 to 450 nm, and violet is shown at a wavelength of 450 to 400 nm. Various colors can be represented by a mixture of colors having each wavelength.

Unlike ultraviolet ray or infrared ray, the visible ray is light visible to a person. The lighting that radiates the visible ray should meet various requirements such as accurate color representation, or the like. Small flickering is one of the requirements.

Since a human being cannot recognize flickering of 200 times or more per second, lighting using a light emitting diode (LED) having fast flickering performance control flickering using pulse width modulation (PWM) in order to expand the lifespan of the LED while saving energy.

Among communication technologies, a line coding technology as a technology for removing a DC component has been known. As an example of the well-known line coding technology, there are 4B5B, 8B10B, Manchester code, or the like. The line coding technology changes data to be transmitted into an optional pattern so that 0 or 1 is not continuously generated.

For example, the 4B5B line code changes 4-bit transmission data into 5 bits. Since 4 bits have 16 bit patterns and 5 bits have 32 bit patterns, only 16 patterns in which 1 and 0 is considerably changed among 32 patterns of 5 bits are selected and corresponds one-to-one the transmission data pattern, thereby making it possible to reduce continuous generation of 0 or 1.

Visible light wireless communication mainly uses on/off keying (OOK), that is, a type of turning-on the LED when data is 1 and a type of turning-off the LED when data is 0. In this case, when the ratio of 1 and 0 per unit time is not constant, brightness is changed, such that there is a problem in that a user sees the flickering. In other words, when transmitting data in which only 1 is repeated for 1 second and only 0 is again repeated for 1 second, the LED lighting is flickered in a unit of 1 second. Due to the problem, the line coding technology is used not to continuously generate 1 and 0.

However, when the visible light wireless communication technology including the line coding technology according to the related art is applied to the lighting using the LED, there is a problem in that it is more likely for a human being to recognize the flickering. For example, in the 4B5B, a pattern of 1 is four and 0 is one, 1 is three and 0 is two, and 1 is two and 0 is three, etc., are mixed in the transmitted 5-bit pattern. Therefore, when the pattern in which 1 is four and 0 is one continuously comes out, brightness is 80% but when the pattern in which 1 is two and 0 is three is continued, brightness is reduced to 40%. When the pattern is repeated, the LED lighting is flickered and the flickering is a serious problem in the visible light wireless communication using the LED lighting.

SUMMARY

The present invention has been made in an effort to constantly maintain brightness of lighting during visible light wireless communication using LED lighting and remove the flickering phenomenon of lighting that can be generated at the time of transmitting data in visible light wireless communication.

Further, the present invention has been made in an effort to provide a new line coding technology that makes the ratio of turning-on lighting and a ratio of turning-off lighting into 1:1.

Further, the present invention has been made in an effort to provide a 4B6B line coding technology capable of removing a DC component by reducing a run length of a data pattern up to 4.

An exemplary embodiment of the present invention provides a visible light wireless communication transmitter, including: a source code recognizing unit that receives a source bit stream and recognizes the source bit stream as source codes of a unit of a first number of bits; and a line coding unit that encodes each of the source codes into an encoding code of a unit of a second number of bits, the second number being larger than the first number, wherein the encoding code has the same number of bits corresponding to 1 as the number of bits corresponding to 0.

The first number may be 4 and the second number may be 6. That is, the line coding technology may be so-called 4B6B.

The visible light wireless communication transmitter may further include an optical signal output unit that outputs visible light signals generated based on the encoding codes each of which corresponds to each of the source codes.

The visible light wireless communication transmitter may use at least any one of "111000" and "000111" among twenty 6-bit patterns in which the number of bits corresponding to 1 is the same as the number of bits corresponding to 0 as an idle pattern that is used in a period where a data transmission is not made.

The visible light wireless communication transmitter uses at least any one of "110100" and "001011" among twenty 6-bit patterns in which the number of bits corresponding to 1 is the same as the number of bits corresponding to 0 as a preamble pattern informing a start of a data frame.

The line coding unit encodes each of the source codes "0000", "0001", "0010", "0011", "0100", "0101", "0110", "0111", "1000", "1001", "1010", "1011", "1100", "1101", "1110", "1111" into any one of the encoding codes "001110", "001101", "010011", "010110", "010101", "100011", "100110", "100101", "011001", "011010", "011100", "110001", "110010", "101001", "101010", "101100".

Another exemplary embodiment of the present invention provides a visible light wireless communication receiver, including: a receiving code recognizing unit that receives visible light signals and recognizes the visible light signals as receiving codes of a unit of a first number of bits; and a line decoder that decodes each of the receiving codes into a decoding code of a unit of a second number of bits, the second number being smaller than the first number. In this case, in each of the receiving codes, the number of bits corresponding to 1 is the same as the number of bits corresponding to 0.

Yet another exemplary embodiment of the present invention provides a visible light wireless communication method, including: receiving a source bit stream and recognizing the source bit stream as source codes of a unit of a first number of bits; and encoding each of the source codes into an encoding code of a unit of a second number of bits, the second number being larger than the first number. In this case, in the encoding code, the number of bits corresponding to 1 is the same as the number of bits corresponding to 0.

Still another exemplary embodiment of the present invention provides a visible light wireless communication method, including: transmitting, as a basic preamble pattern, at least one of 6-bit patterns in which the number of bits corresponding to 1 is the same as the number of bits corresponding to 0; transmitting at least one of the 6-bit patterns other than the basic preamble pattern as an additional preamble pattern uniquely allocated to each terminal; and line encoding 4-bit source codes to be transmitted into any one of the 6-bit pattern other than the basic preamble pattern to transmit the 4-bit source codes.

The additional preamble pattern may be used to distinguish receiving terminals or transmitting terminals and may have a variable length.

The source codes may correspond to the frame header and the frame body.

The basic preamble pattern may be at least any one of "110100" and "001011".

According to the exemplary embodiments of the present invention, it constantly maintains the brightness of lighting during the visible light wireless communication using the LED lighting, thereby making it possible to remove the flickering phenomenon of lighting that can be generated at the time of transmitting data in the visible light wireless communication.

Further, the present invention can provide a new line coding technology that makes the ratio of turning-on lighting and a ratio of turning-off lighting into 1:1.

In addition, the present invention can provide a new 4B6B line coding technology capable of removing DC component by reducing the run length of the data pattern up to 4.

BRIEF DESCRIPTION OF THE DRAWINGS

FIG. 2 is a diagram showing a 6-bit data pattern in which the number of 1 and 0 is three, respectively;

FIG. 3 is a diagram showing a 4B6B line code according to an exemplary embodiment of the present invention;

DESCRIPTION OF EMBODIMENTS

Figure 1:
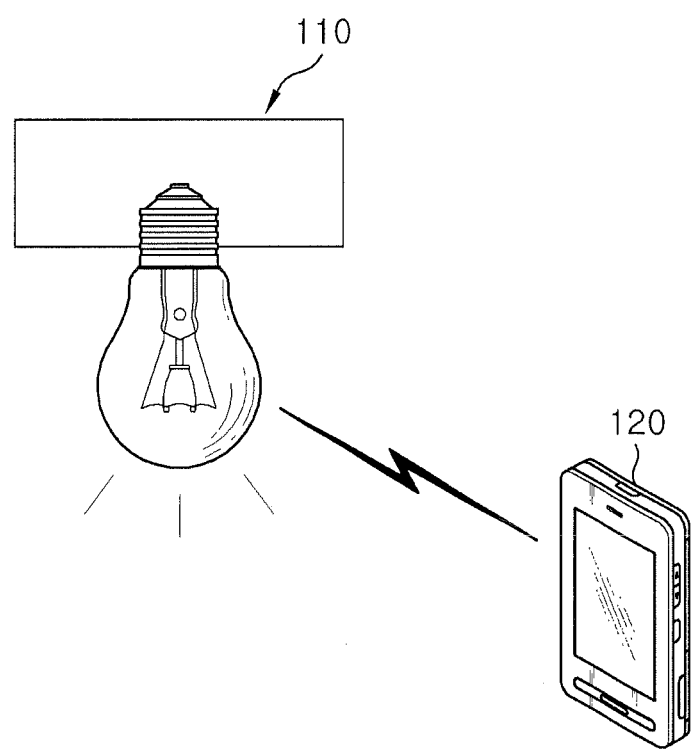
FIG. 1 is a diagram showing a configuration of a system to which a visible light wireless communication apparatus according to the present invention is applied.

The present invention will be described below with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of the elements in the drawings may be exaggerated for explicit comprehension.

Hereinafter, exemplary embodiments of the present invention will be described in detail with reference to the accompanying drawings.

FIG. 1 is a diagram showing a configuration of a system to which a visible light wireless communication apparatus according to the present invention is applied.

Referring to FIG. 1, the visible light wireless communication apparatus includes a lighting apparatus and is configured to include a visible light wireless communication transmitter 110 that outputs visible light signals and a visible light wireless communication receiver 120 that receives the visible light signals.

The configuration of the visible light wireless communication transmitter 110 and the visible light wireless communication receiver 120 shown in FIG. 1 will be described in detail.

In order to originally remove flickering of lighting of the visible light wireless communication transmitter 110, the ratio of turning-on lighting and the ratio of turning-off lighting should be the same as each other, 1:1. That is, when the ratio of 1 and 0 of data transmitted in the visible light wireless communication using lighting such as an LED, etc., is 1:1, flickering does not occur.

In representing 4 bits into 5 bits using a 4B5B line coding technology according to the related art, since the number of available 5 bits is not sufficient and the number of bits of 5-bit code is odd, the ratio of 1 and 0 may not be the same.

In the present invention, the ratio of 1 and 0 may be three by expanding the transmitted data pattern into 6 bits. All 20 patterns have the number of 1 and 0 where each is three in 6-bit data pattern.

FIG. 2 is a diagram showing a 6-bit data pattern in which the number of 1 and 0 is three, respectively.

It can be appreciated from FIG. 2 that all twenty data patterns include three '1's and three '0's.

The 4B6B line coding technology according to the present invention uses sixteen of twenty data patterns shown in FIG. 2 in order to transmit data (4-bit data). Four except for sixteen used to transmit data among twenty data patterns may be used as a preamble pattern or an idle pattern.

For example, the 4B6B line code uses sixteen of twenty patterns shown in FIG. 2 to transmit data, two of twenty patterns are used as a preamble pattern that is a pattern informing a start of a data frame, and the remaining two may be used as an idle pattern used during an idle time that does not perform the data transmission.

FIG. 3 is a diagram showing a 4B6B line code according to an exemplary embodiment of the present invention.

It can be appreciated from referring to FIG. 3 that sixteen 4-bit data correspond to one of sixteen 6-bit patterns and two 6-bit patterns, that is, "110100" and "001011" are set as the preamble pattern, two 6-bit patterns, that is, "111000" and "000111" are set as the idle pattern.

When the selected pattern is used in a reference of selecting patterns in the line code, it is important how many the number of continuous 1 or 0 can be used. The number of continuous 1 or 0 is generally called a run length.

When the existing 4B5B comes out 7 (0111) and then comes out 0 (0000), encoding code "11110" subsequent to encoding code "01111" comes out, such that the run length is 8. As described above, a long run length is a serious failure when the existing 4B5B uses the data and clock recover, etc.

The 4B6B line coding according to the present invention may reduce the run length up to 4.

To this end, "111000" and "000111 among "the 6-bit patterns that have the same number of twenty 1 and 0 may be used as the idle pattern. In other words, when "111000" and "000111" are not used in transmitting and receiving data, the case where a run length is 6 is generated may be removed.

When "111000" and "000111" are not used as the data pattern and 16 of the remaining eighteen 6-bit patterns are selected and used to transmit/receive data, the run length is reduced to 4.

The visible light wireless communication mainly uses on off keying (OOK), that is, a type of turning-on the LED when data is 1 and a type of turning-off the LED. In this case, data 1 and data 0 each corresponds to different voltage or current level. The voltage/current level corresponding to data 1 may be higher and lower than the voltage/current level corresponding to data 0.

Figure 4:
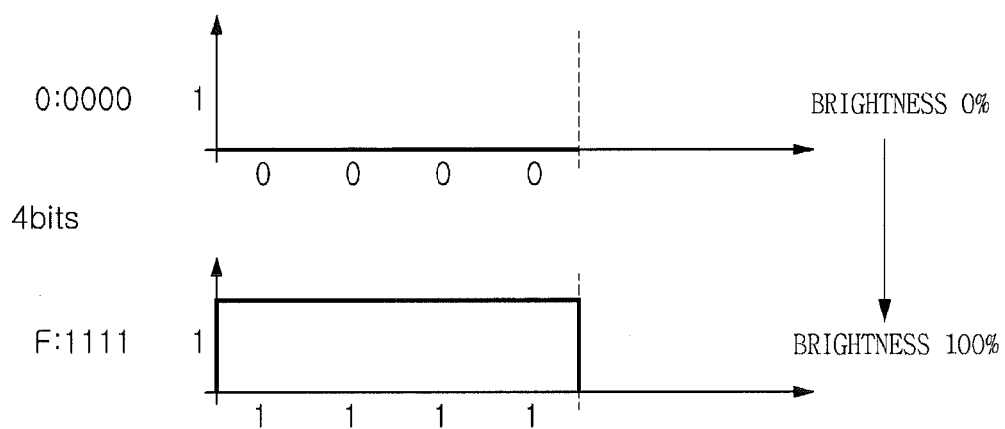
FIG. 4 is a diagram showing the change in brightness of visible light wireless communication lighting when 4-bit source codes are transmitted as they are.

FIG. 4 is a diagram showing the change in brightness of visible light wireless communication lighting when 4-bit source codes are transmitted as they are.

Referring to FIG. 4, it can be appreciated that when a 4-bit source code "0000" is transmitted, the lighting is continuously turned-off and when 4-bit source code "1111" is transmitted, the lighting is continuously turned-on.

Therefore, when source code "1111" just subsequently to source code "0000" to be transmitted is transmitted without being subjected to the line coding, brightness is changed from 0% to 100%.

That is, when the source code is transmitted as it is without being subjected to the line coding, the number of 1 (or, the number of 0) included in data to be transmitted is significantly changed over time, such that the flickering of lighting could not but generate.

Figure 5:
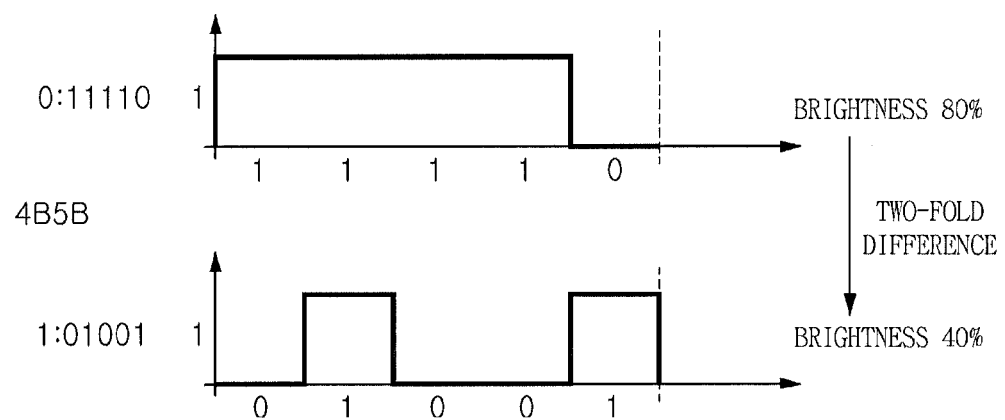
FIG. 5 is a diagram showing the change in brightness of visible light wireless communication lighting when 4B5B line coding is applied.

FIG. 5 is a diagram showing the change in brightness of visible light wireless communication lighting when 4B5B line coding is applied.

It can be appreciated from FIG. 5 that source code "0000" is encoded into 5-bit encoding code "11110" and source code "0001" is encoded into 5-bit encoding code "01001". The encoding code "11110" corresponds to lighting that is turned-on for 80% of a unit time and the encoding code "01001" corresponds to lighting that is turned-on for 40% of a unit time.

Therefore, when source code "0001" just subsequent to source code "0000" to be transmitted is transmitted by being subjected to the 4B5B line coding, brightness is changed from 80% to 40%.

That is, when the 4B5B line coding is used, the change in brightness of lighting according to the data transmission/reception is less than when the source code is transmitted as it is. Therefore, the change in brightness is still increased according to the data to be transmitted, such that the flickering occurs.

Figure 6:
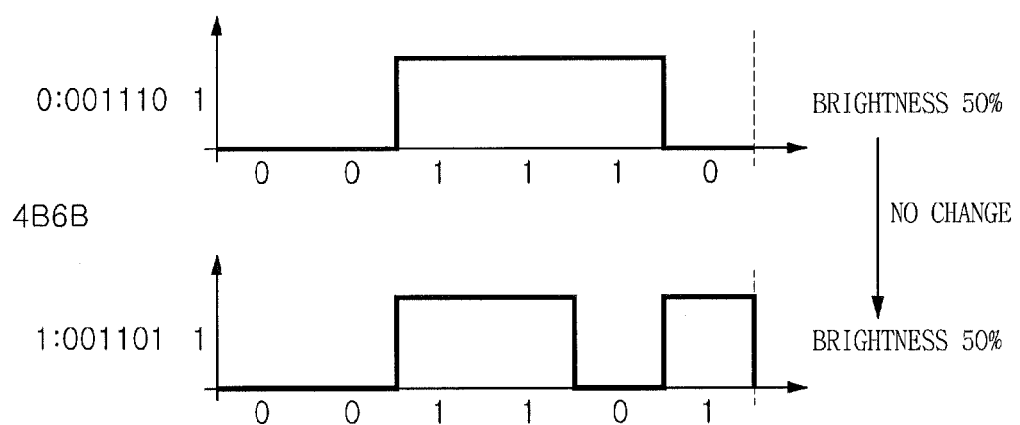
FIG. 6 is a diagram showing the change in brightness of visible light wireless communication when 4B6B line coding according to an exemplary embodiment of the present invention is applied.

FIG. 6 is a diagram showing the change in brightness of visible light wireless communication when 4B6B line coding according to an exemplary embodiment of the present invention is applied.

It can be appreciated from FIG. 6 that source code "0000" is encoded into 6-bit encoding code "001110" and source code "0001" is encoded into 6-bit encoding code "001101." All encoding code "001110" and encoding code "001101" correspond to lighting that is turned-on for 50% of a unit time.

Therefore, when source code "0001" just subsequent to source code "0000" to be transmitted is transmitted by being subjected to the 4B6B line coding, brightness is maintained at 50%.

That is, when the 4B6B line coding is used, brightness is constantly maintained at 50% regardless of whether any source code is transmitted, such that the brightness of lighting according to the data transmission/reception is not changed and the flickering of lighting does not occur.

When the plurality of visible light wireless communication terminals are provided in order to transmit and receive data through visible light, a sender/receiver can be divided using a preamble.

That is, at least one of two 6-bit patterns having the same number of 1 and 0 is used as a basic preamble pattern and the entire preamble pattern may be configured by sequentially concatenating an additional preamble pattern that is the 6-bit patterns dividing the sender or the receiver to the basic preamble pattern.

As described above, due to the use of the preamble pattern corresponding to the combination of the additional preamble pattern that can divide the basic preamble pattern and the terminal, the visible light wireless communication may be performed without flickering from occurring even when the plurality of transmitting terminals and receiving terminals are provided. In this case, the 6-bit patterns corresponding to the basic preamble pattern are not used to transmit/receive data and the additional preamble pattern may be used to transmit and receive data.

For example, the case where three terminals are connected to the LED lighting operated at an access point (AP) may be considered. In this case, the preamble for the first terminal may be generated by the sequential concatenation of "110100" and "001011" that are the basic preamble pattern and "001110" that is the 6-bit representation of "0000." In this case, the preamble for the second terminal may be generated by the sequential concatenation of "110100" and "001011" that are the basic preamble pattern and "001101" that is the 6-bit representation of "0001." In this case, the preamble for the third terminal may be generated by the sequential concatenation of "110100" and "001011" that are the basic preamble pattern and "010011" that is the 6-bit representation of "0010."

That is, the basic preamble pattern may inform the start of the frame and the additional preamble pattern may serve to divide the terminals. In addition, the additional preamble pattern can be added according to the number of simultaneously connected terminals.

Figure 7:
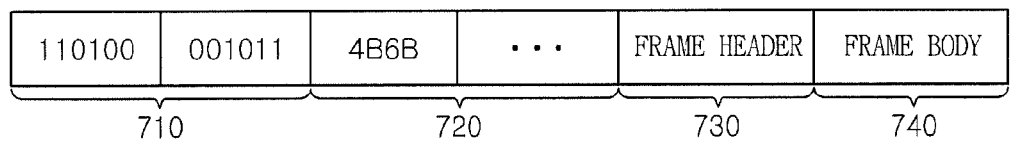
FIG. 7 is a diagram showing a physical structure of visible light wireless communication according to an exemplary embodiment of the present invention.

FIG. 7 is a diagram showing a physical structure of visible light wireless communication according to an exemplary embodiment of the present invention.

Referring to FIG. 7, a visible light wireless communication physical (PHY) architecture includes a basic preamble pattern 710, an additional preamble pattern 720, a frame header 730, and a frame body 740.

For example, the basic preamble pattern 710 may be sequentially concatenated 6-bit codes "110100" and "001011."

The additional preamble pattern may identify the terminals among 6-bit codes used to transmit and receive data and may correspond to the case where two or more 6-bit codes are sequentially concatenated when the number of simultaneously concatenated terminals is many. That is, the length of the additional preamble pattern may be variable according to the number of simultaneously concatenated terminals.

The frame header 730 corresponds to the header including the attribute of frame, etc., and the frame body 740 corresponds to the body of frame including data to be transmitted.

Figure 8:
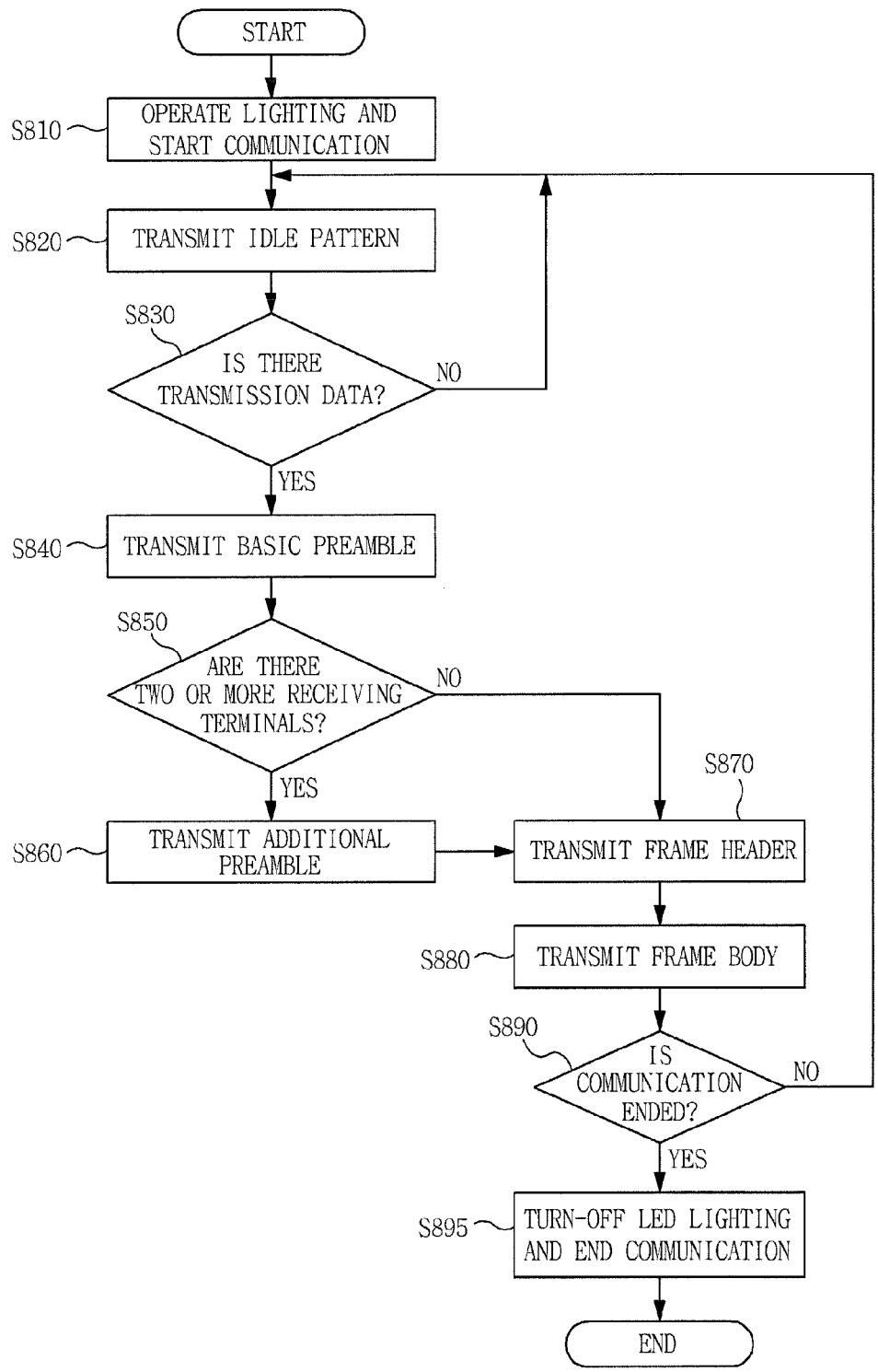
FIG. 8 is an operational flow chart showing a visible light wireless communication method according to an exemplary embodiment of the present invention.

FIG. 8 is an operational flow chart showing a visible light wireless communication method according to an exemplary embodiment of the present invention.

Referring to FIG. 8, the visible light wireless communication method according to an exemplary embodiment of the present invention operates lighting to start the visible light wireless communication (S810).

In addition, the visible light wireless communication method according to an exemplary embodiment of the present invention transmits the idle patterns transmitted for idle time (S820).

In this case, the idle pattern may be at least one of "111000" and "000111" among twenty 6-bit patterns having the same number of 1 and 0.

Further, the visible light wireless communication method determines whether there are data to be transmitted (S830).

As the determination result at step S830, when there are no data to be transmitted, the visible light wireless communication method continuously transmits the idle pattern (S820).

As the determination result at step S830, when there are data to be transmitted, the visible light wireless communication method transmits the basic preamble pattern (S840).

In this case, the basic preamble pattern may be at least one of "110100" and "001011" among twenty 6-bit patterns having the same number of 1 and 0. For example, the basic preamble pattern may be 12-bit pattern "110100001011" in which two 6-bit patterns are sequentially concatenated.

Further, the visible light wireless communication method determines whether the receiving terminals are two or more (S850).

As the determination result at step S850, when there are two receiving terminals, the visible light wireless communication method transmits the additional preamble pattern (S850).

The additional preamble pattern may be one of sixteen 6-bit patterns used to transmit/receive data.

As the determination result at step S850, when the receiving terminal is one or the additional preamble pattern is transmitted, the visible light wireless communication method transmits the frame header S870 and transmits the frame body (S880). In this case, the frame header and the frame body may correspond to the 4-bit source codes.

When the transmission of the frame header and the frame body ends, the visible light wireless communication method determines whether the communication ends (S890).

As the determination result at step S890, if it is determined when communication does not end, the visible light wireless communication method transmits the idle pattern (S820).

As the determination result at step S890, if it is determined that communication ends, the visible light wireless communication method turns-off the LED lighting and ends communication (S895).

All the steps shown in FIG. 8 may be performed in the visible light wireless communication transmitter.

Figure 9:
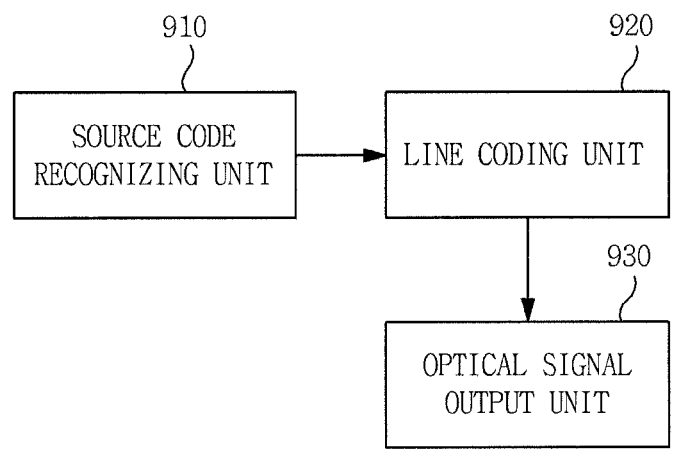
FIG. 9 is a block diagram showing a visible light wireless communication transmitter according to an exemplary embodiment of the present invention.

FIG. 9 is a block diagram showing a visible light wireless communication transmitter according to an exemplary embodiment of the present invention.

Referring to FIG. 9, the visible light wireless communication transmitter includes a source code recognizing unit 910, a line coding unit 920, and an optical signal output unit 930.

The source code recognizing unit 910 receives a source bit stream and recognizes them as source codes of a unit of a first number of bits.

In this case, the first number may be 4.

The line coding unit 920 encodes each of the source codes into the encoding code of a unit of a second number of bits. The second number is larger than the first number.

In this case, the second number may be 6. In other words, the line coding of the present invention may be 4B6B coding.

In this case, in the encoding code, the number of bits corresponding to 1 is the same as the number of bits corresponding to 0.

The optical signal output unit 930 outputs the visible light signals generated based on the encoding codes corresponding to each of the source coders.

In this case, the visible light wireless communication transmitter uses at least any one of "111000" and "000111" among twenty 6-bit patterns in which the number of bits corresponding to 1 is the same as the number of bits corresponding to 0 as the idle pattern that is used in a period where the data transmission is not made.

In this case, the visible light wireless communication transmitter uses at least any one of "110100" and "001011" among twenty 6-bit patterns in which the number of bits corresponding to 1 is the same as the number of bits corresponding to 0 as the preamble pattern informing the start of the data frame. In this case, the preamble pattern may be 12-bit code "110100001011" in which two 6-bit codes are sequentially concatenated.

In this case, the line coding unit 920 may encode each of the source codes "0000", "0001", "0010", "0011", "0100", "0101", "0110", "0111", "1000", "1001", "1010", "1011", "1100", "1101", "1110", "1111" into any one of the encoding codes "001110", "001101", "010011", "010110", "010101", "100011", "100110", "100101", "011001", "011010", "011100", "110001", "110010", "101001", "101010", "101100".

Figure 10:
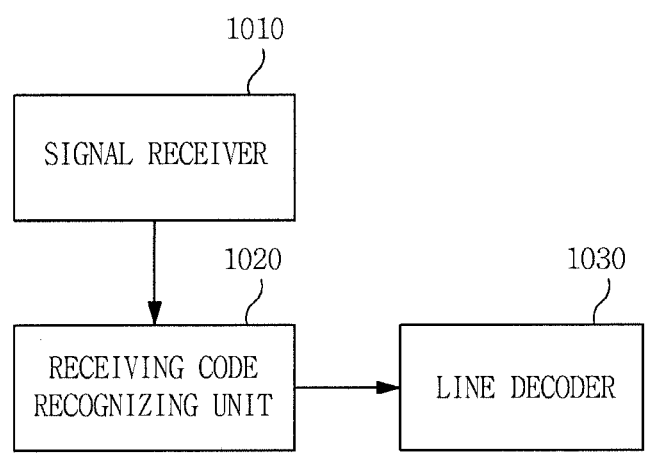
FIG. 10 is a block diagram showing a visible light wireless communication receiver according to an exemplary embodiment of the present invention.

FIG. 10 is a block diagram showing a visible light wireless communication receiver according to an exemplary embodiment of the present invention.

Referring to FIG. 10, the visible light wireless communication receiver according to an exemplary embodiment of the present invention includes a signal receiver 1010, a receiving code recognizing unit 1020, and a line decoder 1030.

The signal receiver 1010 receives the visible light signal.

The receiving code recognizing unit 1020 recognizes the received visible light signals as the receiving codes of a unit of a first number of bits. In this case, each of the receiving codes has the same number of bits corresponding to 1 as the number of bits corresponding to 0.

In this case, the first number may be 6.

In this case, each of the receiving codes is one of twenty 6-bit patterns in which the number of bits corresponding to 1 and the number of bits corresponding to 0 are all 3.

The line decoding unit 1030 decodes each of the receiving signals into the decoding code of a unit of a second number of bits. The second number is smaller than the first number.

In this case, the second number may be 4.

In this case, the visible light wireless communication receiver may be recognized as at least any one of "111000" and "000111" among the receiving codes as the idle pattern.

In this case, the visible light wireless communication receiver may be recognized as at least any one of "110100" and "001011" among the receiving codes as the preamble pattern. In this case, the visible light wireless communication receiver can recognize the 12-bit pattern "110100001011" in which the two 6-bit patterns are sequentially concatenated as the preamble pattern.

In this case, the line decoding unit 1030 may decode each of the source codes "001110", "001101", "010011", "010110", "010101", "100011", "100110", "100101", "011001", "011010", "011100", "110001", "110010", "101001", "101010", "101100" into any one of decoding codes "0000", "0001", "0010", "0011", "0100", "0101", "0110", "0111", "1000", "1001", "1010", "1011", "1100", "1101", "1110", "1111".

Figure 11:
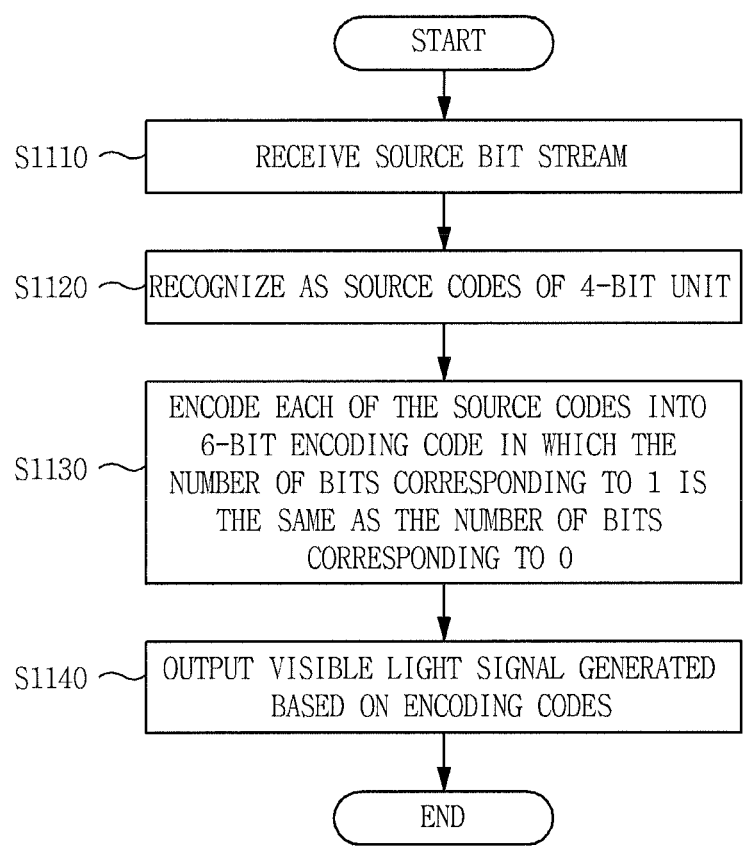
FIG. 11 is an operational flow chart showing a visible light wireless communication method according to another exemplary embodiment of the present invention.

FIG. 11 is an operational flow chart showing a visible light wireless communication method according to another exemplary embodiment of the present invention.

Referring to FIG. 11, the visible light wireless communication method receives the source bit stream (S1110). In this case, the reception is a concept of the reception through the communication channel as well as the transmission of signals in a device.

In addition, the visible light wireless communication method recognizes the received source bit stream as the source codes of 4-bit unit (S1120).

In addition, the visible light wireless communication method encodes each of the source codes into the 6-bit encoding code which has the same number (3) of bits corresponding to 1 as the number of bits corresponding to 0 (S1130).

In addition, the visible light wireless communication method outputs the visible light signal generated based on the encoding codes corresponding to each of the source codes (S1140).

In this case, the visible light wireless communication method uses at least any one of "111000" and "000111" among twenty 6-bit patterns in which the number of bits corresponding to 1 is the same as the number of bits corresponding to 0 as the idle pattern. As described above, the maximum run length of the data transmission/reception may be 4 by not using "111000" and "000111" in the data transmission/reception.

In this case, the visible light wireless communication method can use at least any one of "110100" and "001011" among the twenty 6-bit patterns as the preamble pattern. In this case, the visible light wireless communication receiver can use the 12-bit pattern "110100001011" in which the two 6-bit patterns are sequentially concatenated as the preamble pattern.

As described above, the visible light wireless communication transmitter/receiver and the visible light wireless communication method cannot be limited to the exemplary embodiments, but the embodiments may be configured by selectively combining all the embodiments or some of the embodiments so that various modifications can be made.

What is claimed is:

1. A visible light wireless communication method, comprising:
    receiving a source bit stream and recognizing the source bit stream as source codes of a unit of a first number of bits;
    encoding each of the source codes into an encoding code of a unit of a second number of bits, the second number being larger than the first number; and
    wherein the encoding code has the same number of bits corresponding to 1 as the number of bits corresponding to 0,
    wherein the first number is 4 and the second number is 6, and
    wherein the encoding encodes each of the source codes "0000", "0001", "0010", "0011", "0100", "0101", "0110", "0111", "1000", "1001", "1010", "1011", "1100", "1101", "1110", "1111" into any one of the encoding codes "001110", "001101", "010011", "010110", "010101", "100011", "100110", "100101", "011001", "011010", "011100", "110001", "110010", "101001", "101010", "101100".

2. The visible light wireless communication method according to claim 1, wherein the visible light wireless communication method uses at least any one of "111000" and "000111" among twenty 6-bit patterns in which the number of bits corresponding to 1 is the same as the number of bits corresponding to 0 as an idle pattern.

3. The visible light wireless communication method according to claim 2, wherein the visible light wireless communication method uses at least any one of "110100" and "001011" among the twenty 6-bit patterns as a preamble pattern.

* * * * *